Oct. 16, 1951 — W. S. STAFF — 2,571,776
LOCKING MOUNTING FOR GALVANOMETERS
Filed June 20, 1949 — 2 SHEETS—SHEET 1
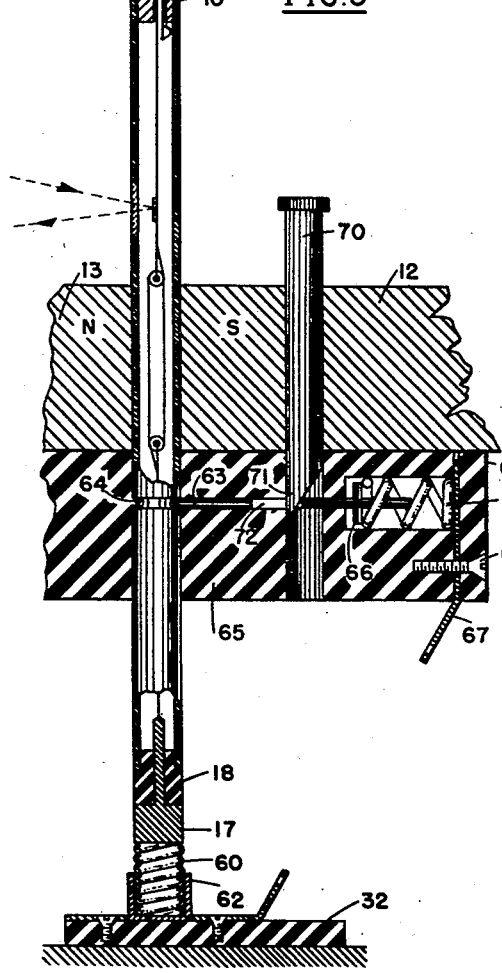
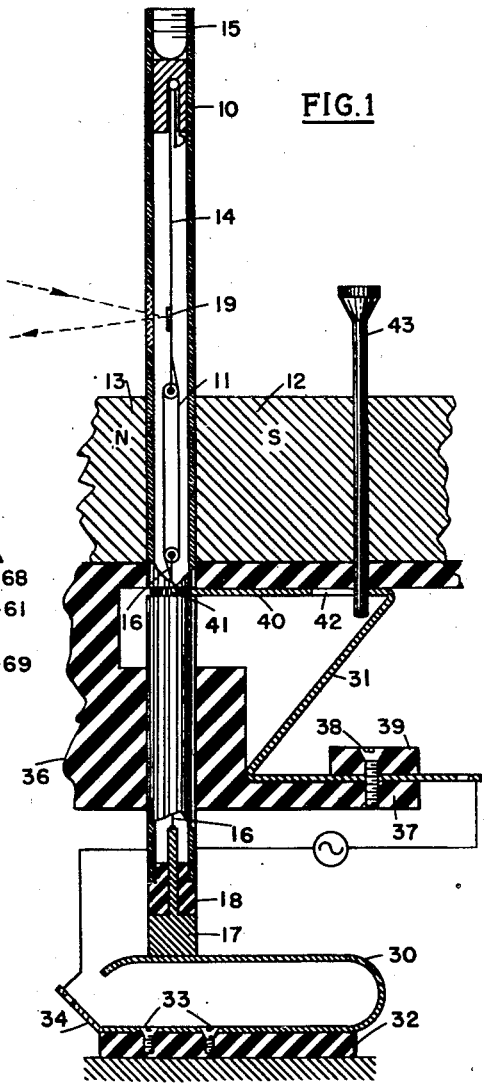
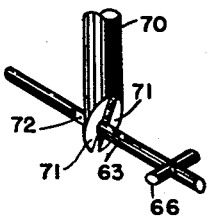
WILLIAM S. STAFF
*INVENTOR.*
BY D. Carl Richards
AGENT

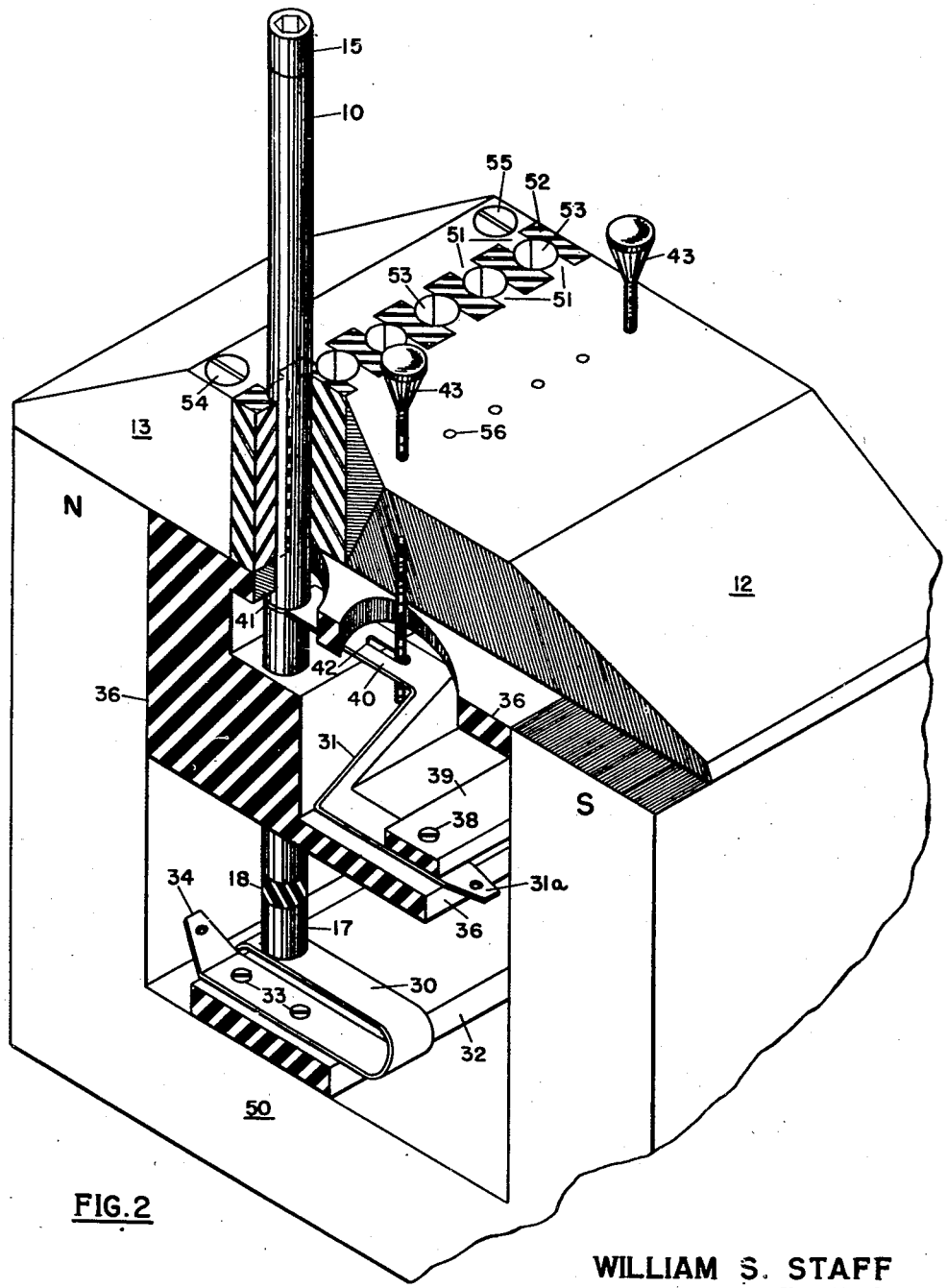

UNITED STATES PATENT OFFICE 2,571,776

LOCKING MOUNTING FOR GALVANOMETERS

William S. Staff, Dallas, Tex., assignor, by mesne assignments, to Socony-Vacuum Oil Company, Incorporated, New York, N. Y., a corporation of New York Application June 20, 1949, Serial No. 100,274

10 Claims. (Cl. 171—95)

This invention relates to oscillographs such as used in seismic exploration and more particularly to an oscillograph galvanometer bank.

In seismic exploration, seismograms are produced having a large number of seismic signals recorded as light beams reflected from a galvanometer mirror projected onto and recorded on relatively narrow photographic film. Recording oscillographs or cameras employing as many as 32 or more galvanometers have been designed to use 8 inch to 10 inch film. It has been found to be difficult to provide not only a small coil-mirror suspension of requisite sensitivity and ruggedness but to provide additionally some means for mechanically mounting the galvanometers in a magnetic field and for electrically connecting the galvanometers, once mounted, to the output circuits of associated amplifiers.

Seismic cameras are subjected to comparatively rough use, being mounted in a recording truck or similar unit for transport to desired field locations. The galvanometers must be so mounted in the camera that they will withstand ordinary accelerations as encountered in transit from one exploring site to another. Additionally, all galvanometers in a bank must be mounted exactly as every other one, and the mounting should permit relatively convenient removal of the galvanometers for servicing, substitution, or replacement to satisfy such needs as arise in the field.

Pencil type galvanometers of the type generically disclosed in applicant's copending application, Serial No. 100,273 filed June 20, 1949, have been found to be satisfactory for seismic operations. By the present invention there is provided a system for mounting such pencil or barrel type galvanometers in a magnetic field; that is, a mounting system which permits accurate physical positioning without the need for additional electrical circuit connections. The electrical contacts for the terminals of the galvanometer exert a mechanical force on the galvanometer not only to assure at all times positive and low resistance connections, but additionally to fix each galvanometer in a predetermined desired position with respect to each other.

In one form of the invention, the galvanometer system for a camera comprises a magnet structure having an aperture, with a barrel type galvanometer freely slidable in the aperture. Resilient means forming one input terminal, insulated from the magnetic structure and movable along the axis of the aperture exerts a force axially of the galvanometer. A second resilient means forming the other input terminal, movable at an angle to the axis into engagement with the barrel of the galvanometer, restrains it against movement by the first-named resilient means and assures positive electrical contact between both of the resilient means and the galvanometer.

Other objects and advantages of this invention will become apparent from the following detailed description taken in conjunction with the accompanying drawings in which:

Fig. 1 is a sectional view of a portion of the galvanometer bank;

Fig. 2 is an isometric view of the galvanometer bank with certain parts omitted;

Fig. 3 is a modification of Fig. 1; and

Fig. 4 is a detailed view of the latching elements of Fig. 3.

Referring now to Fig. 1, a pencil type galvanometer 10 is positioned with its coil 11 in the magnetic flux established in the air gap between the poles 12 and 13 of a permanent magnet. The coil 11 is suspended by filamentary suspension means such as fiber 14 connected to the upper end 15 of galvanometer 10. Similarly, fiber 16 is anchored to an end contact 17. The end contact 17 is insulated from the upper portion 15 by an insulating disk or cylinder 18. When a potential is applied between the contacts 17 and some point on the barrel 15, flow of current through the coil 11 positioned in the magnetic field causes the coil 11 to rotate and deflect a beam of light directed at mirror 19.

The galvanometer is rigidly mounted by the action of spring contacts 30 and 31. More particularly, the contact 30 is formed from flat spring stock having low resistance. It may conveniently be bent back on itself in a U shape and fastened to an insulating strip 32 as by screws 33. The insulating strip 32 may be fastened to or otherwise carried by the magnet structure. When the galvanometer 10 is inserted through the aperture in the magnet structure to a position where coil 11 is at the desired location, spring contact 30 is compressed to the shape illustrated and exerts a force axially on galvanometer 10 tending to force it back out of the aperture. Thus positioned, the force exerted by the spring contact 30 on the galvanometer end contact 17 assures a positive low resistance electrical connection. The end 34 of the spring contact 30 then forms one input terminal to the galvanometer.

A second spring 31, shown as formed in a Z shape is positioned to be movable into engagement with a selected point on the barrel of galvanometer 10. More particularly, non-magnetic structure, as an insulating block 36 is fastened to the pole pieces 12 and 13 as shown in Fig. 2. The bore or aperture 53, Fig. 2, receiving the barrel of the galvanometer 10 extends through the insulating block 36. Spring 31 is secured to the lower arm 37 of the block 36, by screw 38 which also serves to hold spring 31 rigidly under an insulating strip 39. The upper horizontal arm 40 of the spring 31 extends transversely toward the aperture 53, Fig. 2, containing the galvanometer 10. An annular groove 41 is machined into the barrel of galvanometer 10 to receive the end of the arm 40. The end of arm 40 as illustrated is square but may be recessed to conform with the surface of the groove 41. An intermediate portion 42 of the arm 40 is slotted to permit passage therethrough of a release pin 43, best illustrated in Fig. 2. The pin 43 extends through the pole piece 12 of the magnet and the upper portion of the block 36, through the slotted portion 42 of the arm 40 and engages the sloping surface of the Z shaped spring 31.

With the galvanometer thus positioned, spring 30 tends to force the galvanometer out of the magnet structure. The end of arm 40 engaging the groove 41 restrains the galvanometer against axial movement and maintains the contact pressure between spring 30 and the end terminal 17. Additionally, spring 31 located intermediate the ends of the galvanometer barrel and intermediate the ends of the bore in which the barrel is disposed exerts a force upon the galvanometer barrel perpendicular to the axis forcing the galvanometer barrel toward the left as viewed in Fig. 1 for engagement with the wall of the aperture in which it is positioned. The galvanometer 10 may then be rotated about its own axis to focus light deflected from mirror 19 to any desired point without interference from the mounting means. Further, if it is desired to remove the galvanometer 10, the release pin 43 may be depressed to engage the sloping intermediate section of the Z shaped spring 31, retracting the end of the arm 40 from the groove 41. When released, spring 30 forces the galvanometer 10 upwards from its normal position and permits unobstructed removal thereof. If the galvanometer 10 or a replacement therefor is to be inserted into the galvanometer bank, the pin 43 will be depressed to clear the aperture while the end contact 17 passes the arm 40. Thereafter, the release pin 43 may be withdrawn or the pressure removed therefrom and the galvanometer pressed down until arm 40 snaps into groove 41 mechanically positioning and electrically connecting the galvanometer in the bank.

A six-element galvanometer bank is illustrated in Fig. 2. Where appropriate, the same reference characters have been used as in Fig. 1. The magnet structure includes permanent U shaped magnet 50. Pole pieces 12 and 13 are connected to the upper face of the magnet 50. The faces of pole pieces 12 and 13 are shaped to have toothed extensions 51 at regular intervals along the width thereof. Non-magnetic inserts 52 are positioned between each pair of extensions 51. Apertures 53 are bored through the extensions 51 and the inserts 52 to provide arcuate or concave faces to accommodate the cylindrical barrels of the galvanometers. A plurality of galvanometers may thus be mounted in a relatively small space to permit multiple signal recording on relatively narrow film. For example, galvanometers having an outside diameter of .175 inch may be fitted into apertures such as the aperture 53 spaced .20 inch apart, permitting 5 galvanometers per linear inch along the width of the pole pieces.

The mounting means including insulating block 36 is fitted inside of the U shaped magnet 50 and rigidly secured as by screws 54 and 55 extending through pole piece 13 and threadedly engaging the block 36.

The contacts 30 and 31 illustrated in a cooperative restraining relation with the galvanometer 10 may have width equal to or less than the diameter of the galvanometer. The insulating strip 32 may conveniently be carried by the inner recess of the magnet 50. Channels or holes 56 extend through pole piece 12 and the block 36 at spaced intervals corresponding with the spacing of the galvanometer apertures. Release pins 43, two of which have been illustrated may be provided for each galvanometer if desired or a single pin may be inserted into the selected hole when a given galvanometer is to be inserted, removed, or adjusted. It is to be understood that a series of spring contacts such as the contact 30 will be carried by the strip 32, one being positioned on the axis of each of the apertures 53 for contact with end terminals on each of the galvanometers to be inserted therein. Further, a corresponding number of Z shaped spring contacts such as the spring 31 will be carried by the block 36 under the insulating strip 39. However, for simplicity, only one galvanometer and one set of positioning contacts has been illustrated.

Where desired, the apertures 53 may be bored 5 or 10 thousandths of an inch larger through pole pieces 12 and 13 than through the block 36. Such being the case, the galvanometer will be completely electrically insulated from the magnet structure. However, it is generally satisfactory to have one terminal of all galvanometers in a bank electrically common, in which case the block 36 need not be of insulating material, but rather may be of such non-magnetic metals as aluminum or brass and the apertures in the pole pieces and block 36 may be the same diameter. In any event, the channel receiving the galvanometer may be several thousandths of an inch larger than the galvanometer itself so that the galvanometer is freely slidable and rotatable therein. The action of the spring 31 exerting a force perpendicular to the axis of the galvanometers will position all of the galvanometers in the bank against the front walls of their respective channels for their proper alignment.

In the foregoing description, the spring contacts were formed from flat spring stock. Other modifications may, of course, be utilized. In Fig. 3, helical springs 60 and 61 are used in place of springs 30 and 31 respectively. More particularly, the spring 60 carried in a cup or receptacle 62 mounted on the insulating strip 32 is in compression under the terminal 17 of the galvanometer 10 and tends to force the galvanometer out of the bank. The galvanometer is retained in position by the action of a transverse pin 63 extending into the aperture and engaging a circular groove 64 in the galvanometer barrel. The channel through the insulating block 65 carrying pin 63 is enlarged at the end opposite the galvanometer aperture to receive the spring 61. A transverse bar 66 forming an integral part of the pin 63 is positioned in the enlarged portion of the channel and engages the end of the spring 61. The spring 61 positioned in the channel is mounted under compression between the transverse bar 66 and the contact strip 67 which is held in place by the insulating plate 68 fastened to the block 65 by screw 69. When the galvanometer is inserted through the block 65 placing spring 60 under compression, the pin 63 is forced out into engagement with the groove 64 by the spring 61 thus positioning the galvanometer. The pin 63 may be retracted to release galvanometer 10 by the action of pin 70, best illustrated in Fig. 4, which is bifurcated at its lower end to form two sloping arms 71. The arms fit over a flat portion 72 of the rod 63, engaging a shoulder remote from the galvanometer. When pin 70 is depressed, rod 63 is retracted from the groove 64, further compressing the spring 61 to release galvanometer 10.

The groove in the galvanometer barrel may be V shaped, or may be of any shape which presents a relatively abrupt decrease in diameter at a point corresponding with the transverse latching mechanism. In any event, a resilient means engages the lower terminal of the galvanometer, exerting an axial force thereon. A second resilient member operating at an angle to the axis of the galvanometer engages the barrel thereof preventing movement of the galvanometer by the first resilient means. A positive electrical contact is maintained by the elements which mechanically position the galvanometer in the galvanometer bank.

While particular embodiments of the invention have been shown, it will be understood that modifications will now be apparent to those skilled in the art. It is therefore intended by the appended claims to cover any such modifications as fall within the spirit and scope of the invention.

What is claimed is:

1. A system for mounting a barrel type galvanometer, comprising a cylindrical housing therefor, an annular groove in said housing, and an insulated terminal at one end of said housing, a permanent magnet, a pole piece shaped to receive said housing, a spring contact insulated from said magnet and extensible along the axis of said aperture, a second spring contact insulated from said first named contact equal in thickness to the axial width of said annular groove and operative transversely of said aperture whereby said second named spring is received by said groove to position said galvanometer in said aperture to maintain said first named spring in compression and in contact with said insulated terminal without interfering with rotation of said galvanometer about its longitudinal axis.

2. A galvanometer comprising a barrel type galvanometer, a barrel housing the vibratory element of the galvanometer, a permanent magnet, an aperture at the poles of said magnet to receive said barrel, a first resilient means insulated from said magnet and extensible along the axis of said aperture, a second resilient means extensible transversely of said axis, said barrel having an annular groove to receive said second resilient means for maintaining contact between one end of said barrel and said first resilient means, and structure engaging at least one face of said second resilient means to prevent movement thereof in the axial direction of said barrel to fix the position of said barrel within said aperture.

3. A galvanometer comprising an elongated cylindrical barrel for support therein of a vibratory element, magnet structure having an aperture of slightly larger diameter than the diameter of said cylindrical barrel to receive said barrel therein, said barrel having an annular groove for predetermining the position of said barrel within said aperture, means including a spring for opposing movement of said barrel along the axis of said aperture, a locking member disposed for movement into and out of said annular groove, supporting means disposed on the side of said locking member opposite said spring to prevent displacement of said locking member axially of said barrel and to fix the position of said barrel within said aperture without interfering with rotational movement of said barrel about its longitudinal axis, and means for releasing said locking member for removal of said cylindrical barrel from said aperture.

4. A galvanometer of the pencil type including an elongated cylindrical barrel, a magnet structure having an aperture extending therethrough slidably to receive said barrel, a first resilient means movable along the axis of said aperture and bearing against one end of said barrel, a second resilient means biased for movement toward said axis and into engagement with the barrel of said galvanometer to press said barrel in contact with the wall of said aperture for alignment of the axis of said barrel with the axis of said aperture, said barrel having a recess to receive an end of said second biasing means to predetermine the axial position of said barrel within said aperture and to hold said first resilient means under compression, and circuit connections for said galvanometer including said resilient means.

5. A galvanometer of the pencil type including an elongated cylindrical barrel, structure including a magnet having an aperture extending therethrough slidably to receive said barrel, resilient means movable along the axis of said aperture and engageable by an insulated end of said barrel, said insulated end forming a terminal for one portion of the electrical circuit to the galvanometer, the body portion of said barrel forming the other terminal for said circuit, said structure having a transverse opening therein intersecting said aperture intermediate its ends, said barrel having an annular groove which after predetermined movement against the bias of said resilient means is exposed to said transverse opening, and a second resilient means having an end strongly biased along said transverse opening toward said barrel and movable into said groove to press the barrel against the opposite wall of said aperture to prevent longitudinal displacement against the bias of said first-named resilient means, and for completing through said second resilient means the electrical circuit to said barrel and to said galvanometer.

6. A galvanometer comprising an elongated cylindrical barrel for support therein of a vibratory element, structure including magnet pole pieces with faces between which said barrel is slidably disposed and a bore extending from said faces, said barrel having an annular groove for predetermining the axial position thereof relative to said magnet structure, means including a spring for opposing axial movement of said barrel relative to said structure, and a slidable locking member disposed intermediate said bore and said pole pieces for movement into and out of said annular groove and normally biased for movement into said groove to fix the position of said barrel between said faces without interfering with rotational movement of said barrel about its longitudinal axis.

7. A system including a plurality of galvanometers of the pencil type each having its vibratory system enclosed in an elongated cylindrical barrel, magnet structure having toothed extensions spaced one from the other and having opposed concave faces for slidably receiving between each opposed pair one of the cylindrical barrels, a spring contact opposite each pair of extensions engageable by the end of the barrel extending therethrough, each barrel having an annular groove movable into an exposed position after predetermined compression of its associated spring contact, and resilient means for each barrel including a latch normally biased against said barrel for movement into said groove to press the barrel against the associated extension, to retain it in fixed longitudinal position against the bias of its associated spring contact, and to predetermine its position between said extensions without interfering with rotational movement therein.

8. A galvanometer comprising an elongated cylindrical barrel of small diameter for support therein of a vibratory element, magnet structure having spaced concave pole faces slidably to receive therebetween said barrel, resilient means disposed for engagement by an end of said barrel upon slidable movement between said faces, non-magnetic structure disposed below said pole faces having a bore in alignment with said faces for receiving said cylindrical barrel, a second resilient means normally biased for movement against said barrel and disposed between said magnet structure and said non-magnetic structure to bias the portion of said barrel above and below it against the opposed bearing surfaces on the opposite side thereof to predetermine the position of the longitudinal axis of the barrel with respect thereto and to retain said barrel in position against the bias of said first-named resilient means.

9. A galvanometer comprising an elongated cylindrical barrel for support therein of a vibratory element, structure having pole pieces of a magnet with concave faces slidably to receive said barrel therebetween, means including a spring for opposing slidable movement of said barrel between said faces, a slidable locking member biased for movement toward said barrel, said barrel having a recess to receive the end of said locking member, said structure having an opening therethrough in a position adjacent said locking member, said locking member having a portion thereof engageable by a member extending into said last-named opening to move said locking member out of said recess for outward movement of said barrel between said faces.

10. A galvanometer comprising an elongated cylindrical barrel for support therein of a vibratory element, one end of said barrel being insulated from the body portion thereof to form one circuit-connector to the vibratory element, the body portion forming the other circuit-connector to said vibratory element, structure having two apertures whose axes are substantially parallel, said barrel being slidable through a first of said apertures, a spring contact engageable by said insulated end of said barrel and placed under compression by movement of said barrel against the bias thereof, a second spring contact biased for movement against the body portion of said barrel, said body portion having a groove engageable by the end of said second spring contact after predetermined movement of said barrel against the bias of said first-named spring contact, said second spring contact being disposed intermediate the ends of said first aperture, said second-named spring contact having an inclined portion disposed along the axis of said second aperture for actuation by a plunger extending into said second aperture to move said end of said spring contact out of said groove to release said galvanometer for removal from said first aperture.

WILLIAM S. STAFF.

REFERENCES CITED

The following references are of record in the file of this patent:

UNITED STATES PATENTS

| Number | Name | Date |
|--------|------|------|
| 2,104,945 | Guinn | Jan. 11, 1938 |
| 2,149,442 | Kannenstine | Mar. 7, 1939 |